United States Patent [19]

Willms

[11] Patent Number: 5,525,322
[45] Date of Patent: Jun. 11, 1996

[54] METHOD FOR SIMULTANEOUS RECOVERY OF HYDROGEN FROM WATER AND FROM HYDROCARBONS

[75] Inventor: R. Scott Willms, Los Alamos, N.M.

[73] Assignee: The Regents of the University of California, Alameda, Calif.

[21] Appl. No.: 322,874

[22] Filed: Oct. 12, 1994

[51] Int. Cl.⁶ .................... C01B 3/26; C01B 3/12
[52] U.S. Cl. ............................ 423/653; 423/655
[58] Field of Search .................... 423/653, 655

[56] References Cited

U.S. PATENT DOCUMENTS 5,229,102  7/1993  Minet et al. .................... 423/652

OTHER PUBLICATIONS

R. Scott Willms et al., "Fuel Cleanup Systems for Fusion Fuel Processing," Fusion Engr. & Design 18, 53 (1991).
Shigeyuki Uemiya et al., "The Water Gas Shift Reaction Assisted by a Palladium Membrane Reactor," Ind. Eng. Chem. Res. 30, 585 (1991).
Shigeyuki Uemiya et al., "Steam Reforming of Methane in a Hydrogen–Permeable Membrane Reactor," Appl. Catalysis 67, 223 (1991).

*Primary Examiner*—Anthony McFarlane
*Assistant Examiner*—Nhat D. Phan
*Attorney, Agent, or Firm*—Samuel M. Freund

[57] ABSTRACT

Method for simultaneous recovery of hydrogen and hydrogen isotopes from water and from hydrocarbons. A palladium membrane, when utilized in cooperation with a nickel catalyst in a reactor, has been found to drive reactions such as water gas shift, steam reforming and methane cracking to substantial completion by removing the product hydrogen from the reacting mixture. In addition, ultrapure hydrogen is produced, thereby eliminating the need for an additional processing step.

5 Claims, 4 Drawing Sheets

METHOD FOR SIMULTANEOUS RECOVERY OF HYDROGEN FROM WATER AND FROM HYDROCARBONS

FIELD OF THE INVENTION

The present invention relates generally to the simultaneous recovery of hydrogen and hydrogen isotopes from water and hydrocarbons and, more specifically, to the use of a Ni catalyst and a palladium membrane in a heated reactor to drive the water-gas shift reaction and the steam reforming reactions, respectively, involved to substantial completion. This invention was made with government support under Contract No. W-7405-ENG-36 awarded by the U.S. Department of Energy. The government has certain rights in the invention.

BACKGROUND OF THE INVENTION

A significant problem in fusion fuel processing is the recovery of tritium from fusion fuel (D-T) impurities such as water and methane. This is difficult because of the relative stability of these starting materials. Various methods have been used or proposed for this purpose, but most suffer from problems such as waste generation, unreliability and complexity. For a discussion of these methods, see, for example, R. S. Willms and S. Konishi, "Fuel Cleanup Systems for Fusion Fuel Processing," Fusion Engr. & Design 18, 53 (1991). Another area where recovery of purified hydrogen is required is for fuel cells, since the fuel must be free of CO to avoid poisoning the cell.

Combined reactor/permeators have been examined for various applications since the late 1960s. Typically, they consist of a plug-flow catalytic reactor with walls composed of a membrane material. The membrane walls facilitate the addition of reactants or the removal of products along the length of the reactor. This is particularly useful for reversible reactions which are limited by thermodynamic equilibrium. Products can be removed as the reaction proceeds and, with a proper membrane, reactions can be made to proceed to essentially 100% conversion.

Using shift catalysts, hydrogen can be recovered from water and methane as free hydrogen. Examples of these reactions are:

$CO+H_2O \leftrightarrow CO_2+H_2$ (Water Gas Shift); and $CH_4+H_2O \leftrightarrow CO +3H_2$ (Steam Reforming).

Both reactions are reversible and are limited by thermodynamic equilibrium. By including a membrane in the reactor, which selectively removes $H_2$ from the reacting system, the reactions can be brought to near completion. Methane and water are the principal hydrogen isotope (protium, deuterium, and tritium)-containing products from fusion reactions. Hydrocarbons, which may also be utilized in the steam reforming reaction, and water are the principal hydrogen-containing sources of hydrogen for fuel cells.

Shigeyuki Uemiya et al., in "The Water Gas Shift Reaction Assisted by a Palladium Membrane Reactor," Ind. Eng. Chem. Res. 30,585(1991), have shown that a membrane reactor provides higher levels of carbon monoxide conversion beyond the equilibrium attainable in a closed system. This is a result of a shift in thermodynamic equilibrium of the water gas shift reaction toward the product side by the selective and rapid removal of hydrogen from the reacting system. Carbon monoxide and steam at atmospheric pressure were reacted over an iron-chromium oxide catalyst heated to 673K in a reactor having a palladium membrane inner tube supported on a porous glass cylinder. The authors also discuss copper-based catalysts which must be operated at lower temperatures.

Similar improvement in the steam reforming of methane has been reported by Shigeyuki Uemiya et al., in "Steam Reforming of Methane in a Hydrogen-Permeable Membrane Reactor," Appl. Catalysis 67, 223 (1991). There, methane was reacted with steam over a Ni catalyst heated to between 623 and 773K in a reactor incorporating a palladium film supported on a porous glass cylinder.

However, there is no suggestion in these references that both reactions could be made to proceed efficiently using a single shift catalyst at a single temperature in a permeable membrane reactor.

Accordingly, it is an object of the present invention to simultaneously recover substantially pure hydrogen from water and hydrocarbons in an efficient single-step process.

Another object of the present invention is to recover deuterium and tritium from fusion reactor exhaust which contains deuterium- and tritium-bearing water and hydrocarbons.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for simultaneous recovery of hydrogen and hydrogen isotopes from water and hydrocarbons of this invention may comprise the steps of mixing carbon monoxide and water with the feed material, forming thereby a gas mixture such that the reactions $CO+H_2O \leftrightarrow CO_2+H_2$, and $CH_4+H_2O \leftrightarrow CO+3H_2$ may occur with the substantial consumption of the hydrogen-bearing compounds in the feed material; passing the gas mixture over a heated nickel catalyst such that hydrogen is generated; permitting the hydrogen generated thereby to pass through a heated palladium membrane; and removing the permeated hydrogen from the vicinity of the membrane.

In another aspect of the present invention, in conformance with its objects and purposes, the method for recovering hydrogen from water hereof may include the steps of mixing carbon monoxide with the water, forming thereby a gas mixture such that the reaction $CO+H_2O \leftrightarrow CO_2+H_2$ may occur; flowing the gas mixture over a heated nickel catalyst such that the equilibrium of the reaction permits substantial generation of hydrogen; contacting the resulting gas mixture with a heated palladium membrane; and removing the hydrogen which has permeated the palladium membrane.

Benefits and advantages of the method of the present invention include the simultaneous recovery of hydrogen and hydrogen isotopes from water and methane in a single processing step using a single reactor.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, the present invention includes a method for simultaneously recovering substantially pure hydrogen and hydrogen isotopes from water and from hydrocarbons by utilizing a single catalyst and a palladium membrane in a one-step process to drive the water gas shift reaction and the steam reforming reaction, respectively, to substantial completion.

Figure 1:
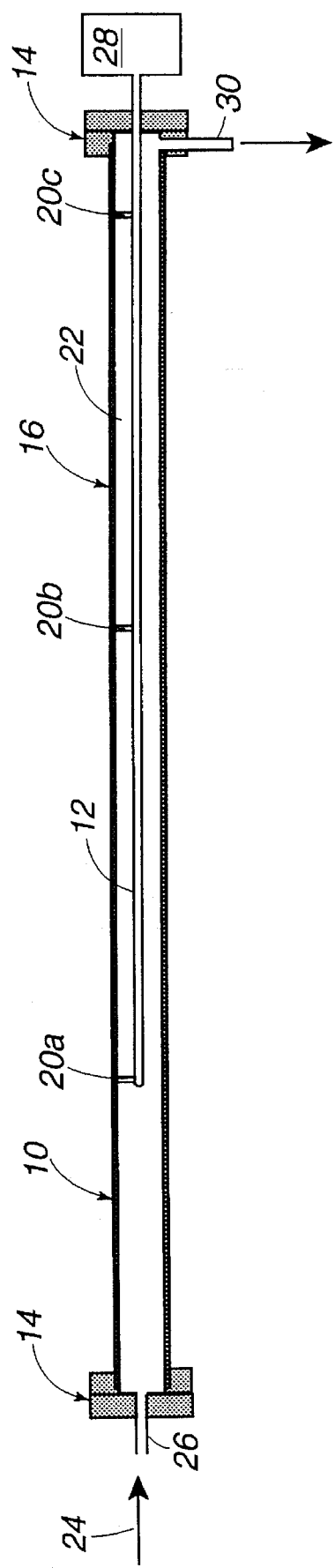
FIG. 1 is a schematic representation of the palladium membrane reactor utilized to demonstrate the present method, and illustrates the spatial relationship between the catalyst and the permeable membrane.

Turning now to FIG. 1, the palladium membrane reactor, 10, utilized in the practice of the present method is illustrated. Permeator tube, 12, is fabricated from 0.2 mm thick 75% Pd/25% Ag, has a length of 530 mm (including 11.9 mm flange, 14), and an outer diameter of 5 mm. Flange 14 facilitates easy removal of the tube 12 from the reactor shell, 16. Reactor shell 16 is constructed of 0.065 in. thickness 304 stainless steel having an outer diameter of 1 in., and a length of 26 in. measured between the flange (14, 18) surfaces. Thermowells, 20a–c, permit the measurement of the membrane surface temperature. Annular space, 22, between membrane 12 and reactor shell 16 is packed with catalyst. The use of demountable flanges (14, 16) allows access to the inside of the shell for changing catalyst.

Reactant gases, 24, are fed into the reactor through a ¼ in. tube, 26, welded into flange 18. As reactions occur over the catalyst, $H_2$ is extracted from the annular space by permeation through Pd/Ag membrane 12, which is maintained at low pressure by pump 28. Gases which do not pass through membrane 12, are exhausted through ¼ in. tube, 30.

Catalyst is typically packed to within about 1 in. from either end of the reactor. The remaining volume is filled with stainless steel wool.

Reactor 10 is heated by enclosing it in a split-hinge tube furnace (not shown). The furnace is mounted vertically and employs three independently controlled heaters to maintain uniform temperature along the length of the reactor.

Gases 24 are mixed with flow rates between 0 and 500 sccm. To this mixture, water can be added via a syringe pump which injects into a heated line to produce steam. Exhaust gas diagnostics include humidity, flow rate, pressure and gas composition. Pressure and flow rate are measured for hydrogen passing through the membrane.

Iron-based catalysts with Cr stabilizers are commonly referred to as high-temperature water gas shift catalysts. In industrial practice, Fe catalysts are only partially reduced and are used in reactions with excess water. In situations where it is desirable to recover all hydrogen isotopes (for example, in the situation where spent fuels generated in fusion reactors are processed), an excess of CO is used to ensure complete conversion of water. Such an environment reduces the iron oxide catalyst to elemental iron. It is believed that the elemental Fe further reacts with CO to form iron carbide, resulting in plugged reactors as was observed by the present inventor. Similar catalysts have been used, without such plugging, but since the concern is generally to maximize CO conversion, excess water rather than excess CO, as in the present situation, is employed. Thus, iron-based catalysts are not believed to be useful for applications where excess CO is to be employed.

Copper/zinc-based catalysts are commonly referred to as a low-temperature water gas shift catalysts. The present inventor utilized this catalyst at 310° C. in order to permit the palladium membrane to function, but observed a decrease in reactor performance with time, as indicated by increasing humidity in the retentate and decreasing permeate flow rate. Since such catalysts are designed to be operated between 180–250° C., it is believed by the inventor that too high a temperature was employed in the reactor.

Having generally described the present invention, the following examples are presented to more particularly illustrate its features. A United Catalyst Ni-based catalyst (type C150-4-03, ¼ in. pellets) was utilized. This material is commonly marketed as a steam reforming catalyst. Various forms of Ni reforming catalyst are sold which are intended for use at temperatures ranging from ~500° C. ("pre-reforming" catalyst) to ~900° C. The "pre-reforming" catalyst which was used in this study has a very high Ni content (co-precipitated with alumina) to maximize its activity. Ni catalysts have not been used for water gas shift since such catalysts become active at temperatures which are too high for thermodynamic equilibrium for this reaction to be maximized (lower temperatures increase conversion). However, as illustrated herein, by using a permeable membrane reactor, overall $H_2$ recovery is not limited by thermodynamic equilibrium.

EXAMPLE 1

Figure 2:
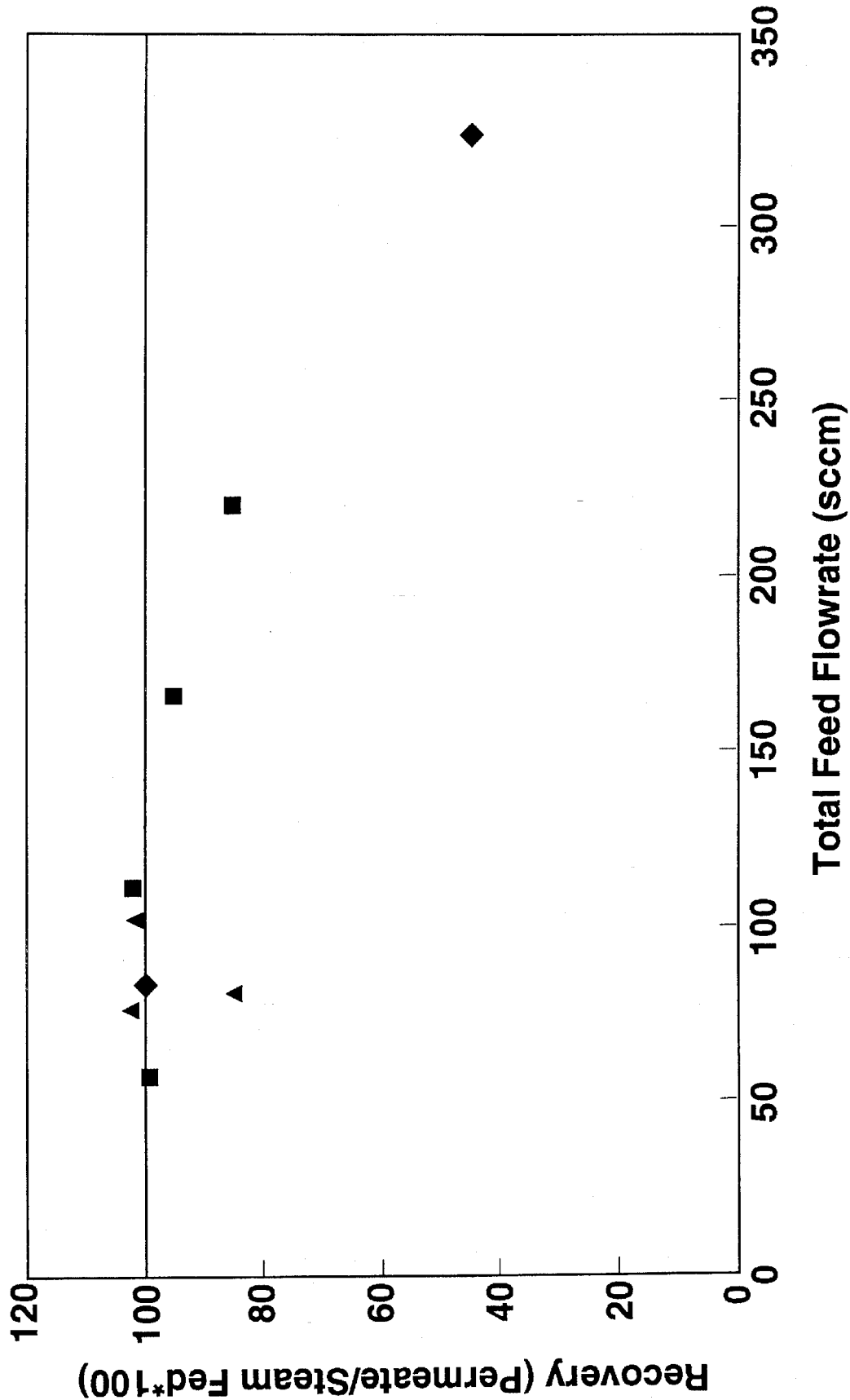
FIG. 2 shows the percent recovery of hydrogen for the water gas shift reaction over a Ni catalyst at 500° C. as a function of feed gas flow rate.

Water Gas Shift using a Ni Catalyst:

Experiments were conducted at 500° C. with a feed containing CO:water ratios of 1.0 (triangles), 1.2 (squares) and 1.6 (diamonds), and the results presented in FIG. 2. Recoveries approach 100% up to total flow rates of about 110 sccm. Conversions without a membrane present would otherwise have been limited to 65–83% by the equilibria for the different feeds. It is observed that the hydrogen recovery drops substantially at higher flow rates. This indicates that there is insufficient residence time for the hydrogen produced in the palladium membrane reactor to permeate the membrane. This reaction has not previously been reported.

EXAMPLE 2

Figure 3:
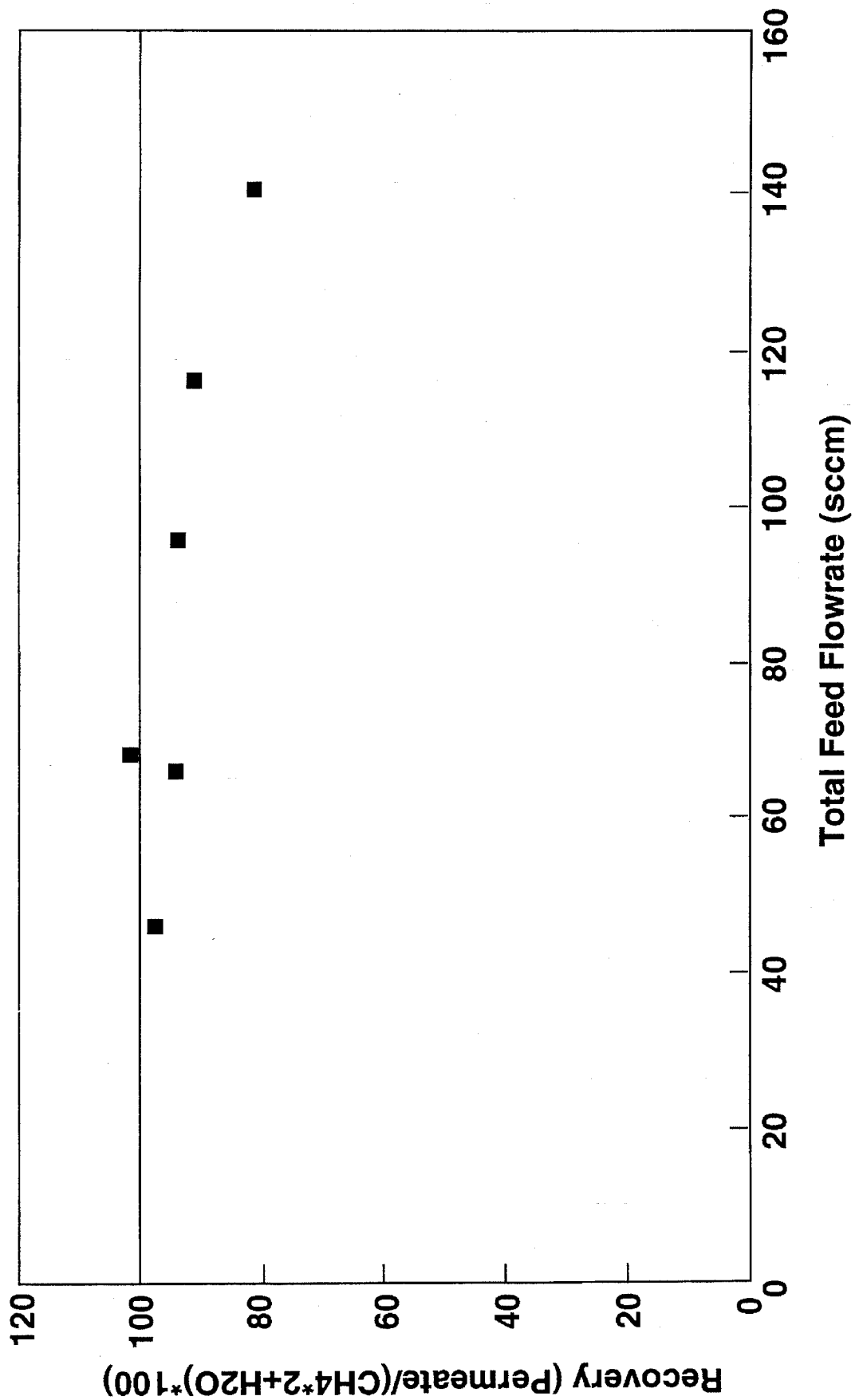
FIG. 3 shows the percent recovery of hydrogen for the steam reforming reaction over a Ni catalyst at 500° C. as a function of feed gas flow rate.

Steam Reforming using a Ni Catalyst:

A series of experiments was conducted with a $CH_4$ and $H_2O$ feed at 500° C. Various amounts of Ar and CO were included in some of the feed mixtures. However, there is insufficient data to draw definitive conclusions regarding the effects of varying $CH_4$:water ratios and the presence of CO or Ar in the feed. Effects on hydrogen recovery appear to be small. The results are summarized in FIG. 3. The methane-to-water ratio was 0.80 for all experiments except the one conducted at 120 sccm, for which the ratio was 1.6. Recoveries approach 100% at flow rates up to about 70 sccm.

EXAMPLE 3

Figure 4:
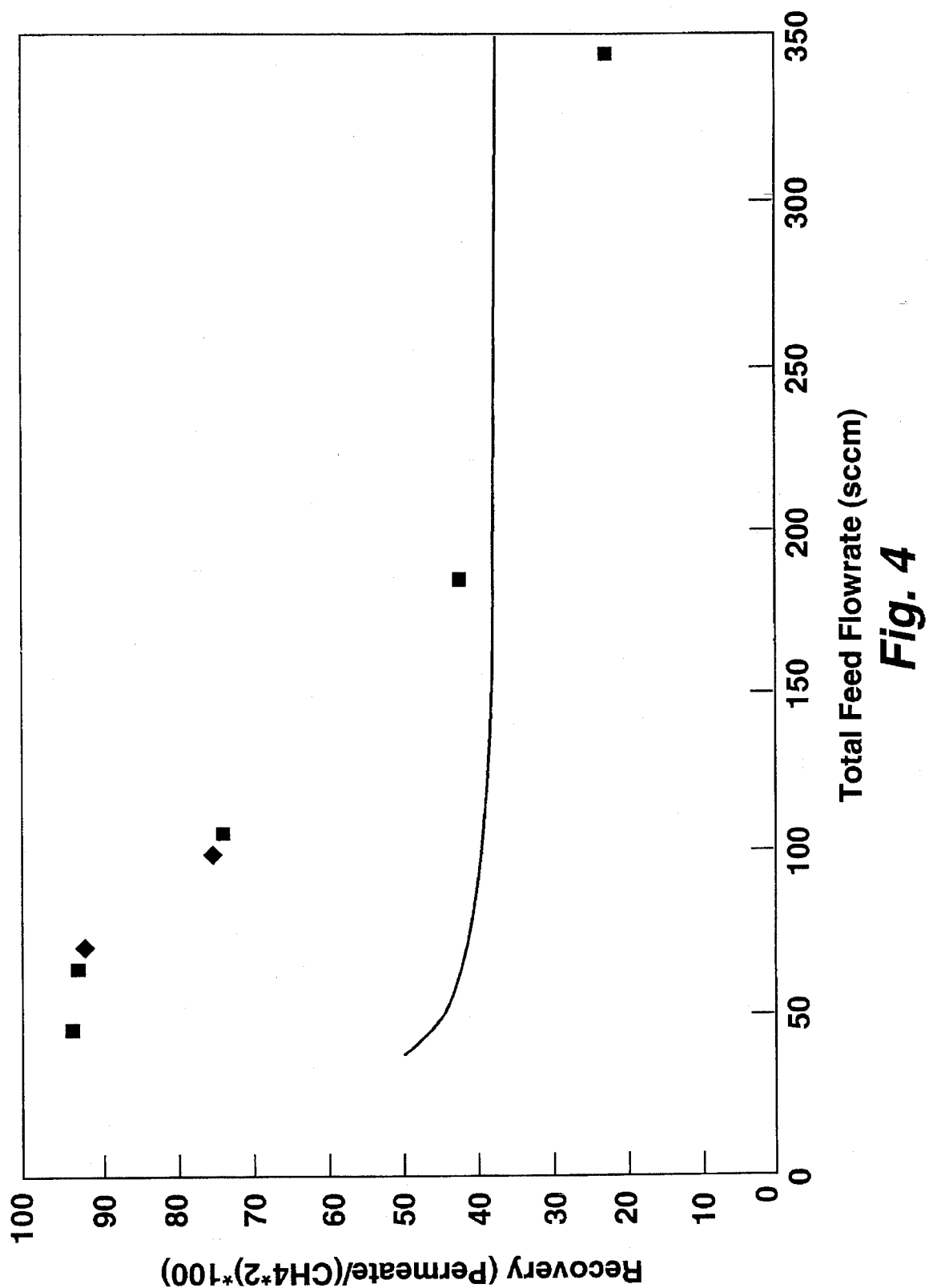
FIG. 4 shows the effects of methane cracking on the recovery of hydrogen over a Ni catalyst at 500° C. as a function of feed gas flow rate.

Methane Cracking using a Ni Catalyst:

A competing reaction is the methane cracking reaction, $CH_4 \leftrightarrows C+2H_2$, which was studied at 500° C. using feeds of $CH_4$ with either Ar or CO. The results are summarized on FIG. 4. The maximum hydrogen recoveries observed were about 94% at total flow rates of about 50 sccm. Also plotted in FIG. 4 is the thermodynamic equilibrium conversion that would be expected for the $CH_4/Ar$ data without the hydrogen-permeable membrane. At lower flow rates, there is a significant difference between the palladium membrane reactor recoveries and the thermodynamic equilibrium. It is clear that $CH_4$ cannot be cracked over this catalyst indefinitely without excessive coking problems. Preliminary experiments have shown that it is possible to remove the carbon from the bed subsequent to $CH_4$ cracking by treatment with $H_2$ (running the cracking reaction in reverse) or $CO_2 (C+CO_2 \leftrightarrows 2CO)$. Treatment with pure or diluted oxygen would also be expected to prove effective. However, it is most efficient to insure that sufficient water is available such that the reforming reaction is the predominant one.

A single catalyst is therefore capable of effectively promoting water gas shift, steam reforming and methane cracking reactions. Further, this catalyst is known to be very robust and is not expected to suffer from deactivation problems. The Ni catalyst, when used in cooperation with a palladium membrane, is capable of producing conversions much greater than thermodynamic limits which apply in typical reactors. This is a result of the hydrogen product being continuously removed.

Moreover, in one processing step, the palladium membrane reactor can remove hydrogen isotopes from gaseous impurities generated from the fusion process and separate these isotopes from the remaining reaction products. The $H_2$ product needs no further treatment before being transferred, for example, to a cryogenic isotope separation system, as part of the fusion fuel recovery process.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for recovering hydrogen isotopes from hydrocarbon and water feed material, which comprises the steps of:

a. mixing carbon monoxide and water with the feed material, forming thereby a gas mixture such that the reactions $CO+H_2O \leftrightarrow CO_2+H_2$, and $CH_4+H_2O \leftrightarrow CO+3H_2$ can occur;

b. flowing the gas mixture over a heated nickel catalyst such that the equilibrium of the reactions permits substantial generation of hydrogen isotopes;

c. contacting the resulting gas mixture with a heated palladium membrane; and d. removing the hydrogen isotopes which have permeated the palladium membrane.

2. The method as described in claim 1, wherein the nickel catalyst and the palladium membrane are heated to substantially the same temperature.

3. The method as described in claim 1, wherein the nickel catalyst and the palladium membrane are in contact.

4. The method as described in claim 2, wherein the nickel catalyst and the palladium membrane are heated to above 400° C.

5. The method as described in claim 1, wherein the amounts of carbon monoxide and water are chosen such that the hydrogen-bearing compounds in the feed material are substantially consumed in the reactions.

* * * * *